United States Patent
Cline et al.

(10) Patent No.: US 6,896,803 B2
(45) Date of Patent: May 24, 2005

(54) FILTER APPARATUS AND ASSOCIATED METHOD

(75) Inventors: L. Steven Cline, Fayetteville, NC (US); Henry L. Neufeld, Tulsa, OK (US)

(73) Assignee: Arvin Technologies, Inc., Troy, MI (US)

( * ) Notice: Subject to any disclaimer, the term of this patent is extended or adjusted under 35 U.S.C. 154(b) by 126 days.

(21) Appl. No.: 10/401,420

(22) Filed: Mar. 28, 2003

(65) Prior Publication Data

US 2004/0188346 A1 Sep. 30, 2004

(51) Int. Cl.⁷ .............................................. B01D 35/34
(52) U.S. Cl. ..................... 210/248; 210/440; 210/453; 210/454; 210/457; 29/513; 156/293
(58) Field of Search ................................ 210/238, 437, 210/438, 440, 450, 453, 454, 455, 470, 248, 457, 458; 29/513; 156/73.1, 73.5, 82, 293

(56) References Cited

U.S. PATENT DOCUMENTS

| | | |
|---|---|---|
| 2,185,281 A | 1/1940 | Tear |
| 2,197,252 A | 4/1940 | Decker |
| 2,547,857 A | 4/1951 | Cook |
| 2,578,020 A | 12/1951 | Sanberg |
| 2,654,483 A | 10/1953 | Ahlijian |
| 3,268,077 A | 8/1966 | Ball |
| 3,272,336 A | 9/1966 | Humbert, Jr. |
| 3,388,800 A | 6/1968 | MacGregor |
| 3,397,786 A | 8/1968 | Hultgren |
| 3,640,390 A | 2/1972 | Goy et al. |
| 3,724,665 A | 4/1973 | Hall |
| 4,256,579 A | 3/1981 | Rose et al. |
| 4,676,895 A | 6/1987 | Davis |
| 4,783,271 A | 11/1988 | Silverwater |
| 4,906,365 A | 3/1990 | Baumann et al. |

(Continued)

FOREIGN PATENT DOCUMENTS

| | | | |
|---|---|---|---|
| DE | 39 03 675 A1 | 2/1989 | |
| DE | 42 40 656 A1 | 12/1992 | |
| DE | 43 31 598 A1 | 9/1993 | |
| DE | 298 15 023 U1 | 8/1998 | |
| EP | 1 285 683 A1 | 2/2003 | |
| GB | 2 162 079 A | 1/1986 | |
| JP | 2002191909 A | * 7/2002 | ........... B01D/27/10 |
| WO | WO 97/48470 | 12/1997 | |
| WO | Wo 01/12294 A1 | 2/2001 | |

OTHER PUBLICATIONS

European Search Report and Annex Thereto (3 pages) (Sep. 7, 2004).

*Primary Examiner*—Matthew O. Savage
(74) *Attorney, Agent, or Firm*—Barnes & Thornburg LLP (57) ABSTRACT

A filter apparatus comprises a ring secured to a filter cover so as to engage a center tube extending within a filter element to retain the center tube and the filter element. A method of assembling a filter apparatus is also disclosed.

31 Claims, 9 Drawing Sheets

U.S. PATENT DOCUMENTS

| | | |
|---|---|---|
| 4,948,503 A | 8/1990 | Baumann et al. |
| 5,024,761 A | 6/1991 | Deibel |
| 5,374,355 A | 12/1994 | Habiger et al. |
| 5,413,712 A | 5/1995 | Gewlss et al. |
| 5,538,626 A | 7/1996 | Baumann |
| 5,556,542 A | 9/1996 | Berman et al. |
| 5,589,060 A | 12/1996 | Gebert et al. |
| 5,695,633 A | 12/1997 | Ernst et al. |
| 5,698,097 A | 12/1997 | Gebert et al. |
| 5,702,602 A | 12/1997 | Brown et al. |
| 5,762,788 A | 6/1998 | Gullett |
| 5,770,054 A | 6/1998 | Ardes |
| 5,770,065 A | 6/1998 | Popoff et al. |
| 5,814,215 A | 9/1998 | Bruss et al. |
| 5,846,416 A | 12/1998 | Gullett |
| 5,902,479 A | 5/1999 | Fukumori et al. |
| 5,928,511 A | 7/1999 | Messner et al. |
| 5,984,109 A | 11/1999 | Kanwar et al. |
| 5,989,413 A | 11/1999 | Jauss et al. |
| 6,006,924 A | 12/1999 | Sandford |
| 6,015,492 A | 1/2000 | Popoff et al. |
| 6,068,763 A | 5/2000 | Goddard |
| 6,217,755 B1 | 4/2001 | Stifelman et al. |
| 6,251,273 B1 | 6/2001 | Jawurek et al. |
| 6,627,078 B1 | 9/2003 | Wagner |
| 2003/0010689 A1 * | 1/2003 | Yano et al. ............ 210/130 |

* cited by examiner

FILTER APPARATUS AND ASSOCIATED METHOD

FIELD OF THE DISCLOSURE

The present disclosure relates generally to filter apparatus for filtering fluids.

BACKGROUND OF THE DISCLOSURE

Filter apparatus are used onboard vehicles and in other apparatus containing fluid systems to remove unwanted solids or other contaminants from fluids. For example, filter apparatus are used to filter oil used in vehicle engines.

SUMMARY OF THE DISCLOSURE

According to one aspect of the disclosure, a filter apparatus comprises a ring secured to a filter cover so as to engage a center tube extending within a filter element. The filter element is secured to the center tube and is configured to filter a fluid advanced therethrough.

According to another aspect of the disclosure, a method of assembling the filter apparatus comprises the steps of securing the ring to the filter cover so as to retain the center tube and securing the filter element to the center tube. The step of securing the ring to the filter cover may comprise advancing the ring from a position spaced apart from the filter cover to a position engaging the filter cover.

The above and other features of the present disclosure will become apparent from the following description and the secured drawings.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Figure 1:
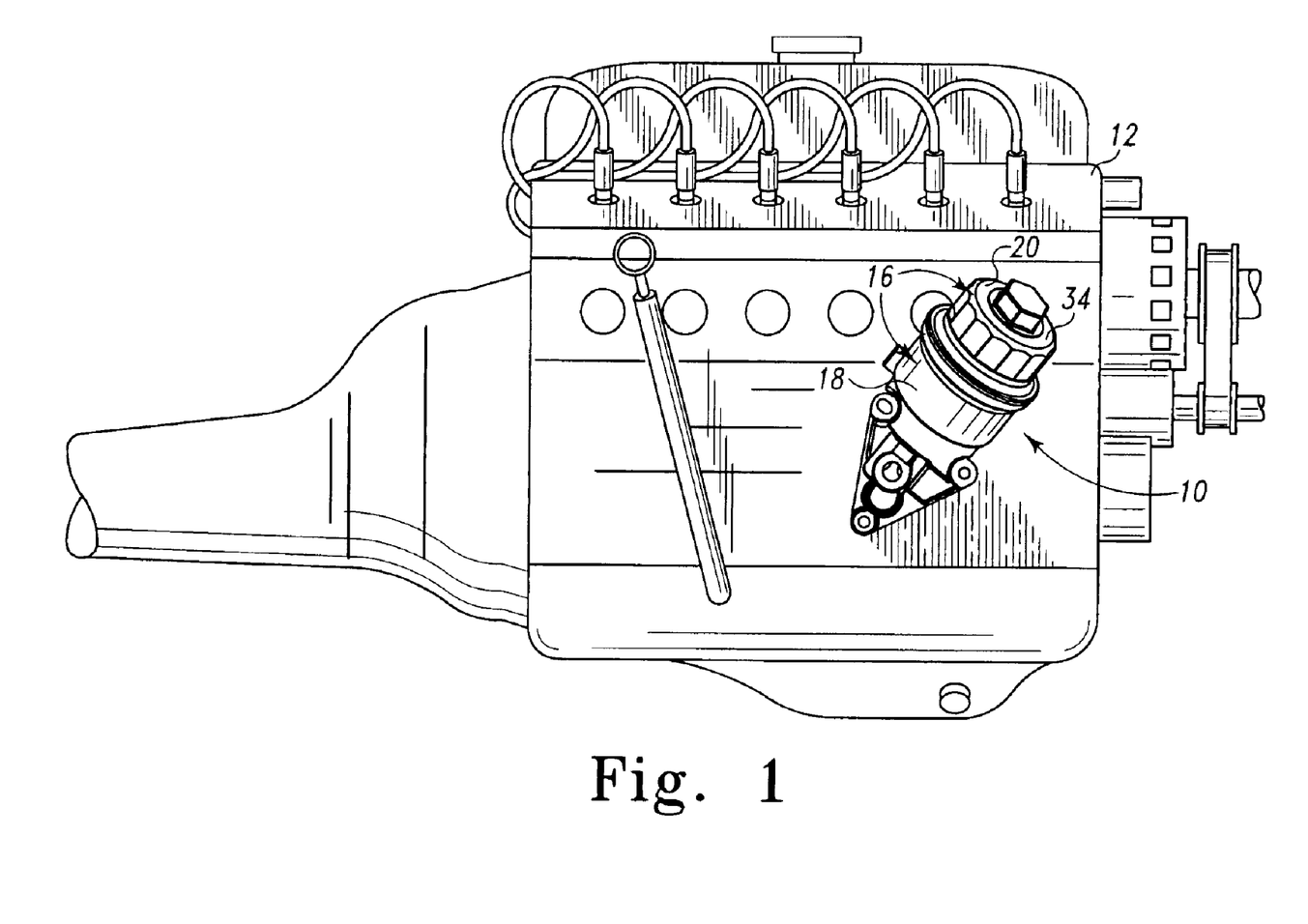
FIG. 1 is an elevation view showing a filter apparatus mounted to an engine to filter fluid (e.g., oil) during operation of the engine.
Figure 2:
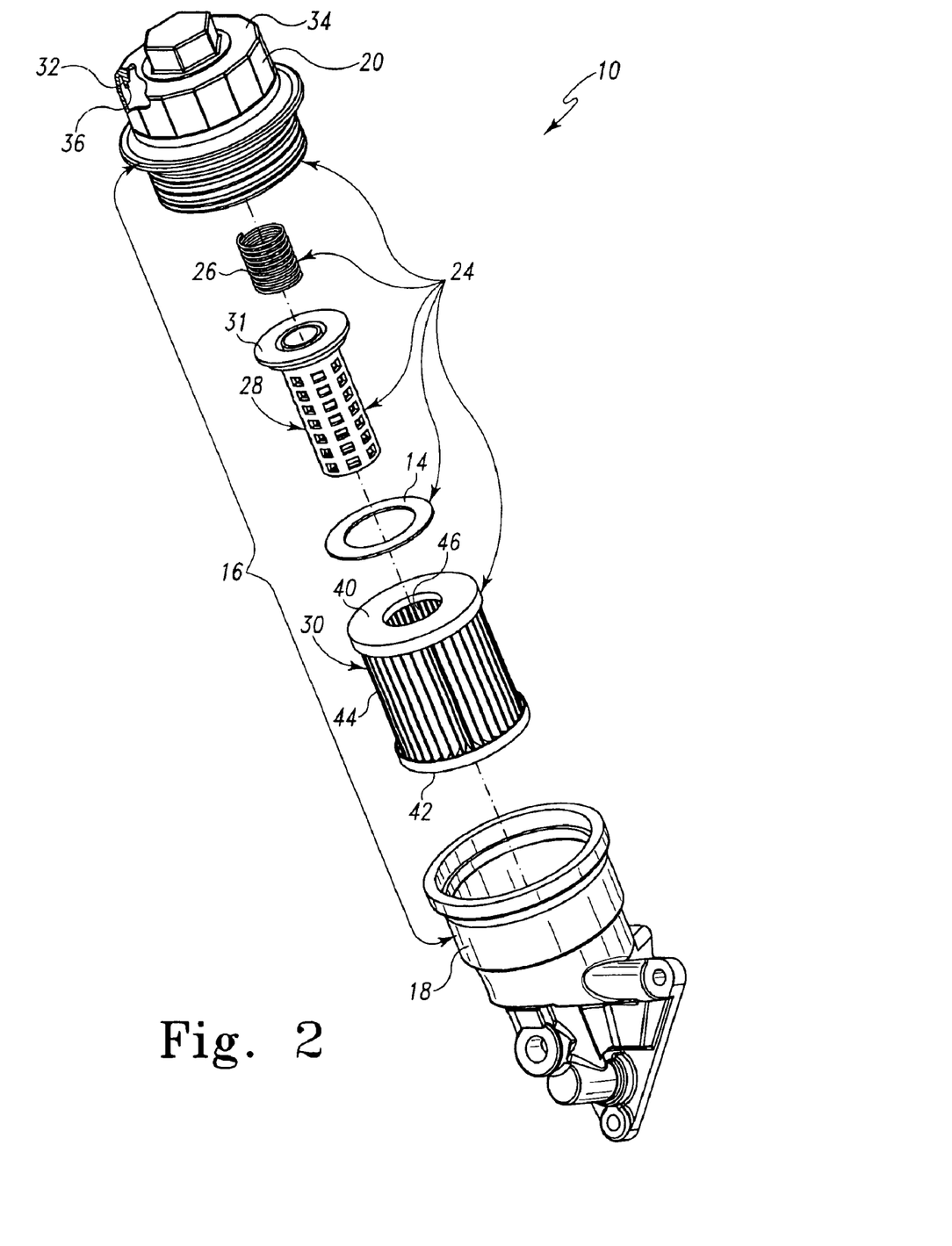
FIG. 2 is an exploded perspective view, with portions broken away, of the filter apparatus.

A filter apparatus 10 shown in FIG. 1 is configured to filter a flow of fluid through the filter apparatus 10. The filter apparatus 10 may be mounted to a fluid source such as an engine 12 to filter contaminants from fluid such as engine oil. The filter apparatus 10 comprises an annular ring 14 (see FIGS. 2–7) to retain components of the filter apparatus 10 during assembly thereof as discussed in more detail herein.

A housing 16 of the filter apparatus 10 is shown in FIGS. 1–2 and 6–7. The housing 16 comprises a filter base 18 and a filter cover 20. The base 18 is configured to be secured to the engine 12. The cover 20 is configured to be secured to the base 18 via a threaded or other suitable connection to contain components of the filter apparatus 10 in an interior region 22 (see FIG. 7) defined by the cover 20 and the base 18.

Figure 5:
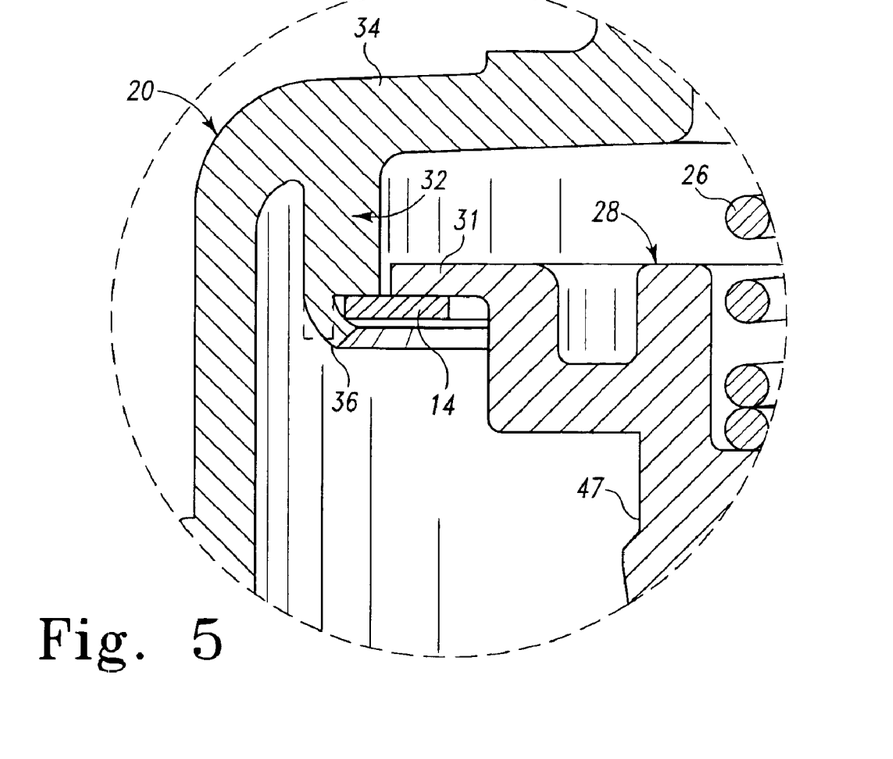
FIG. 5 is an enlarged sectional view of region A of FIG. 4 showing an ear bent over the ring to secure the ring to the filter cover.
Figure 6:
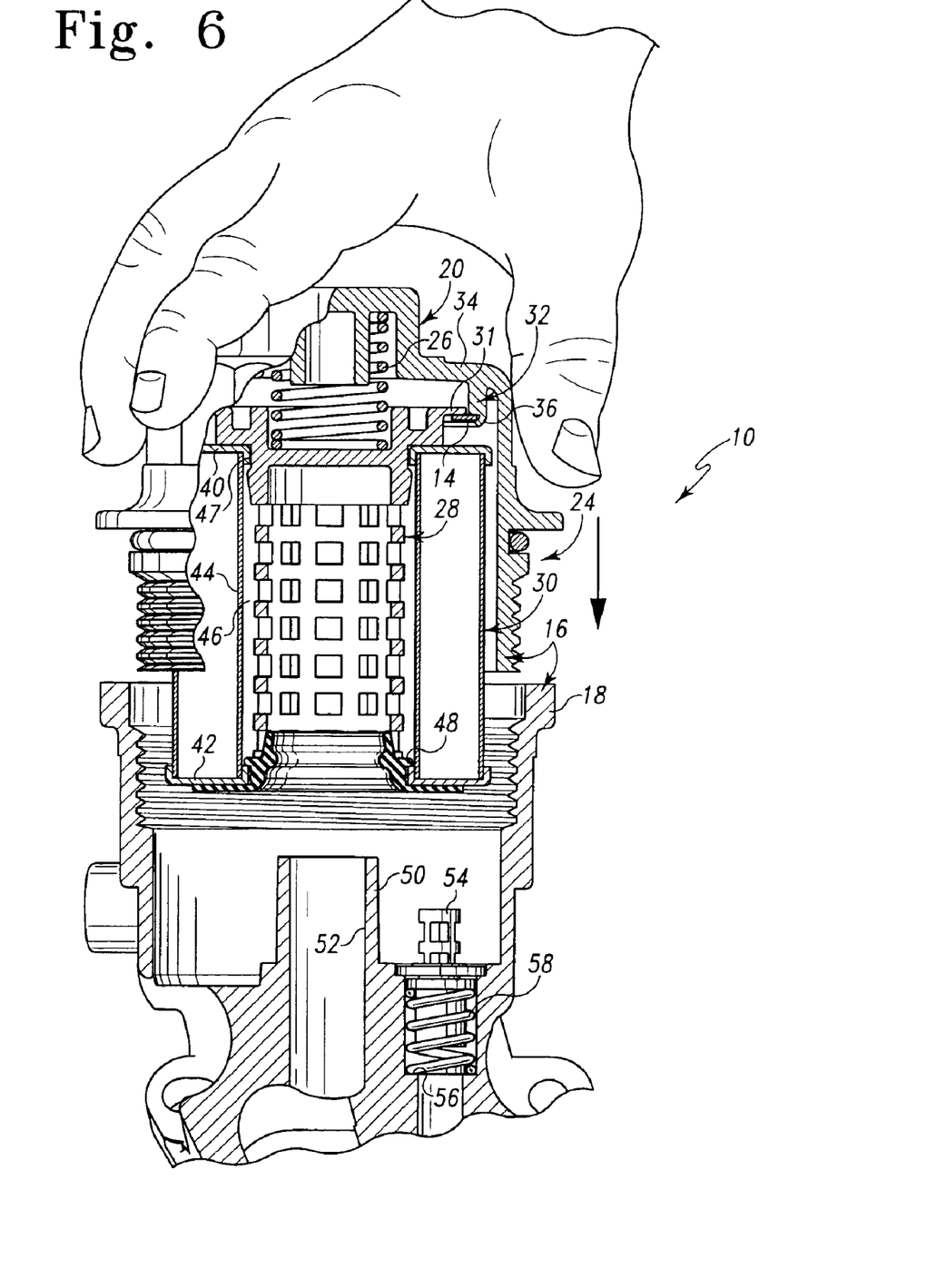
FIG. 6 is a sectional view showing the ring engaging the center tube to retain the center tube, the filter element secured thereto, and the spring during assembly of the filter apparatus.
Figure 7:
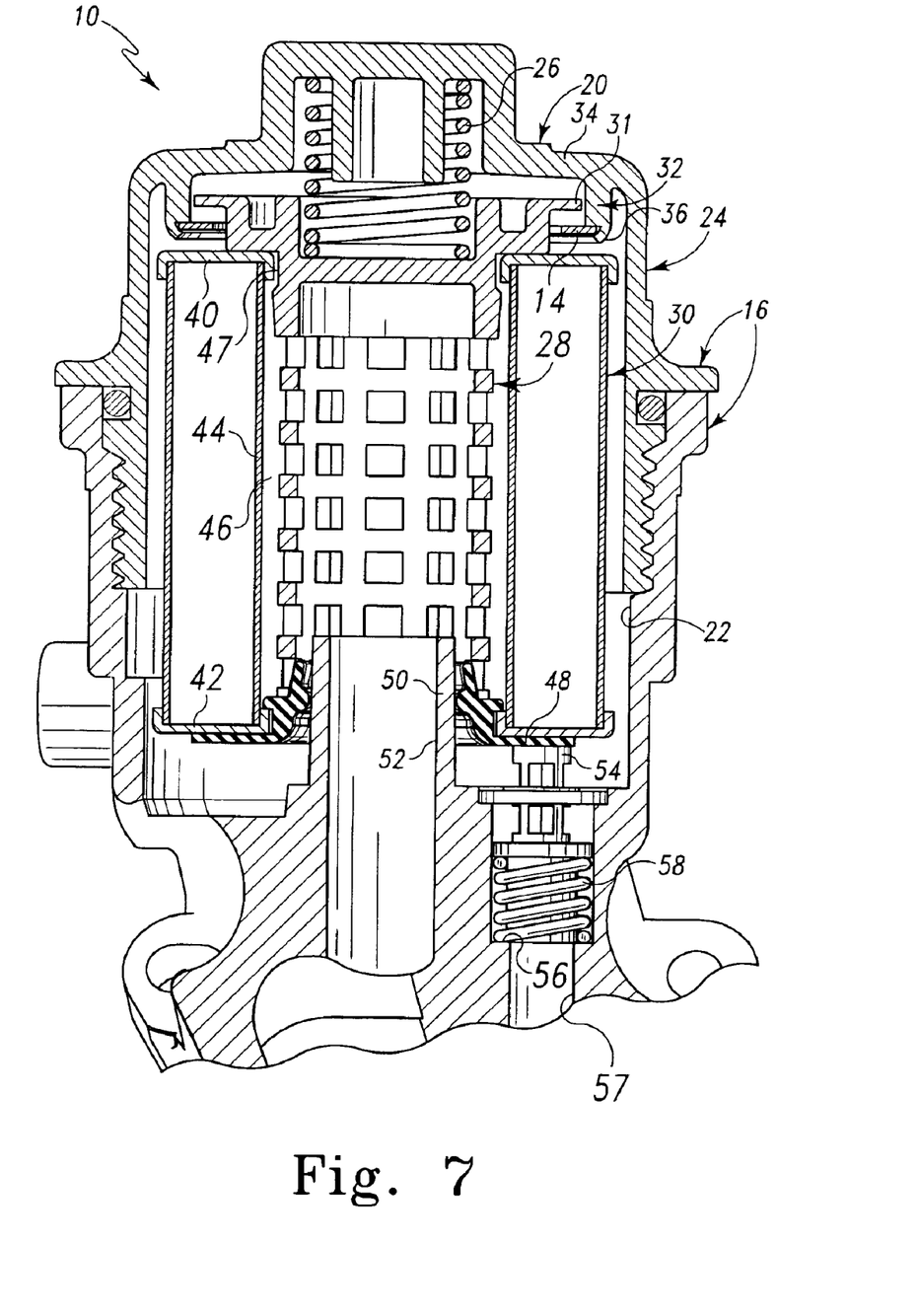
FIG. 7 is a sectional view showing the filter apparatus assembled.

During assembly of the filter apparatus 10 (see FIGS. 3–7), components of the filter apparatus 10 are secured to the cover 20 to provide a sub-assembly 24. As shown in FIGS. 6–7, the sub-assembly 24 comprises the ring 14, the cover 20, a spring 26, a center tube 28, and a filter element 30.

As shown in FIG. 7, the center tube 28 includes a tubular portion positioned within the fitter element 30 and a flange 31 extending radially outwardly from the tubular portion for engagement and disengagement with the portion of the ring. The flange 31 includes annular first, second, and third walls positioned in series in end-to-end relation, the first wall extending radially outwardly from the tubular portion and engaging an axially facing surface of an end cap 40 of the filter element 30, the second wall extends axially from the first wall and through an aperture defined by the ring 14, and the third wall extends radially outwardly from the second wall for engagement and disengagement with the portion of the ring 14. The first and third walls are parallel to one another, and the second wall is perpendicular to the first and third walls. The center tube 28 is a one-piece structure such that the flange 31 and the tubular portion are one piece with one another. The ring includes a surface which engages a standoff 32 and provides the portion of the ring 14 which is arranged to engage and disengage the center tube 28.

Figure 3:
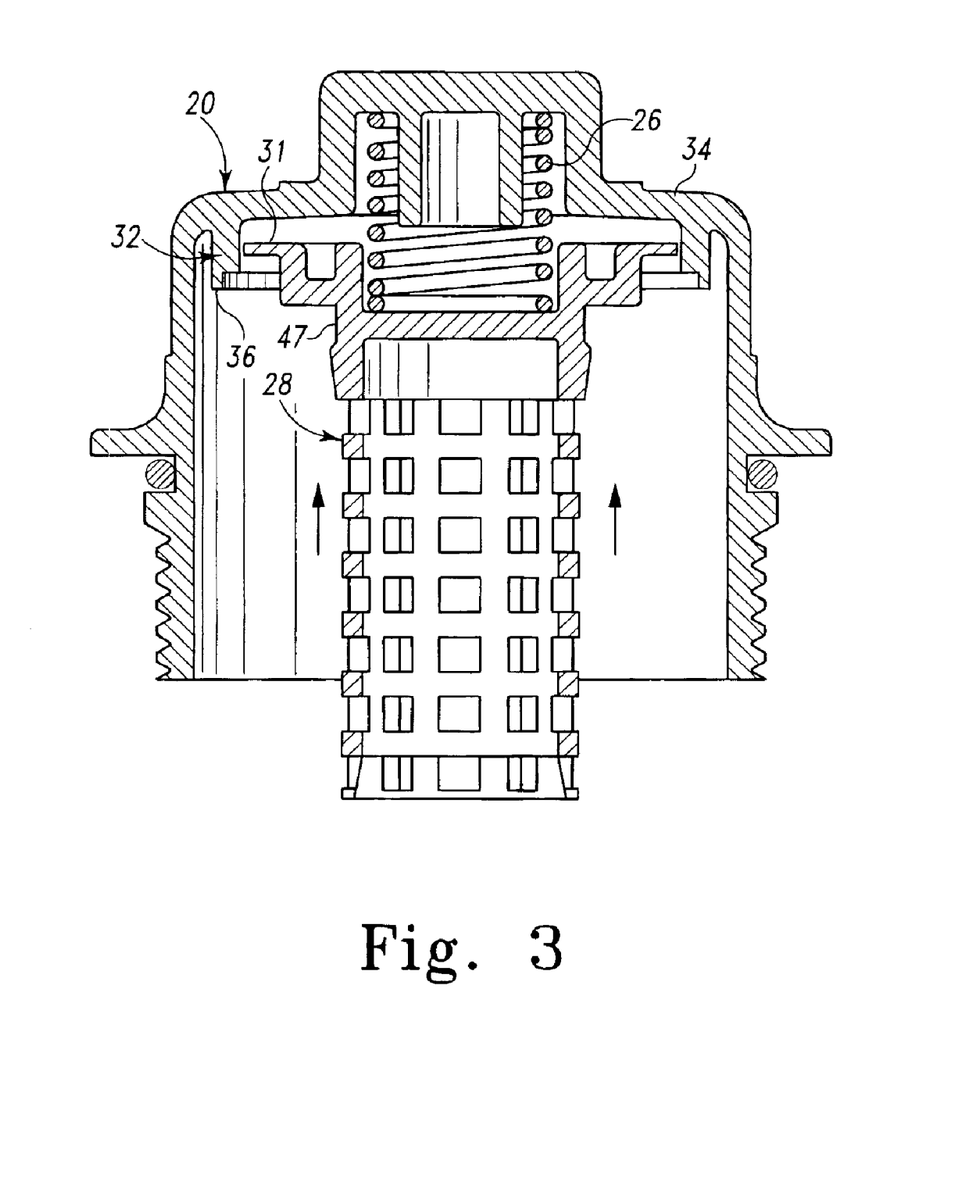
FIG. 3 is a sectional view of components of the filter apparatus showing a center tube inserted within a filter cover against a spring.
Figure 4:
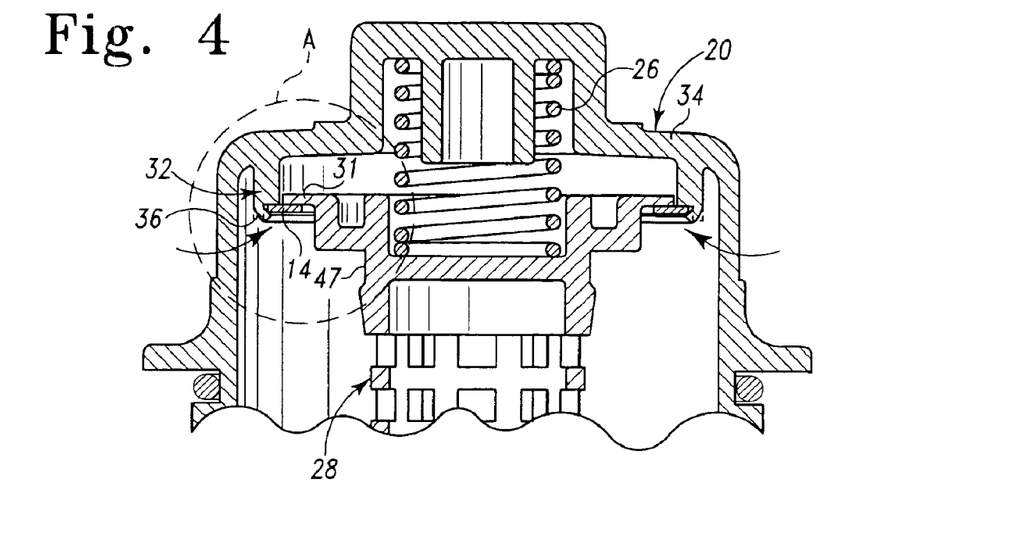
FIG. 4 is a sectional view showing the spring biasing the center tube against a ring secured to the filter cover.

To assemble the sub-assembly 24, the spring 26 and the center tube 28 are advanced within the cover 20, as shown in FIG. 3. The center tube 28 and the cover 20 capture the spring 26 therebetween. The ring 14 is then advanced within the cover 20 and secured thereto, as shown in FIGS. 4–5. In particular, the ring 14 is secured to a standoff 32 of the cover 20. Accordingly, the ring 14 is non-unitary with the cover 20. The standoff 32 extends from an upper wall 34 of the cover 20 and is, for example, annular. It should be appreciated that there may be a plurality of non-annular standoffs extending from the upper wall 34 for securement of the ring 14 thereto. To secure the ring 14 to the standoff 32, the ring 14 is advanced from a position spaced apart from the standoff 32 to a position engaging an annular surface of the standoff 32. An annular ear 36 of the standoff 32, which is, for example, made of metal, is then bent inwardly over the ring 14 to secure the ring 14 in place. The ring 14 is discrete from the standoff 32 to avoid forming an undercut in the standoff 32 for retention of the center tube 28.

Before the sub-assembly 24 is secured to the base 18, the spring 26 biases the center tube 28 into engagement with the ring 14. In particular, the spring 26 applies a biasing force to a central portion of the center tube 28 to bias an outwardly extending flange 31 of the center tube 28 into engagement with the ring 14. The ring 14 has an inner diameter less than an outer diameter of the flange 31 for such engagement between the ring 14 and the flange 31.

The filter element 30 is then advanced into engagement with the center tube 28 and secured thereto, as shown in FIGS. 6–7. The filter element 30 comprises annular end caps 40, 42. The filter media 44 is captured between the end caps 40, 42 and configured to filter fluid such as oil advanced therethrough. The center tube 28 extends in a filtered fluid region 46 defined by the filter element 30 to provide internal support to the filter media 44 as fluid flows inwardly through the filter media 44 into the filtered fluid region 46. The end cap 40 extends in an annular groove 47 formed in an upper portion of the center tube 28 to secure the top of the filter element 30 to the center tube 28. An elastomeric seal 48 is secured to the end cap 42 and engages a lower portion of the center tube 28 to secure the bottom of the filter element 30 to the center tube 28.

The ring 14 thus retains the spring 26, the center tube 28, and the filter element 30 within the cover 20 before securement of the sub-assembly 24 to the base 18. It should be appreciated that the spring 26 and the center tube 28 may be advanced within the cover 20 subsequent to securement of the ring 14 to the cover 20.

After the sub-assembly 24 is assembled, it is advanced into engagement with the base 18, as shown in FIG. 7. In particular, the cover 20 is secured to the base 18 so as to position the ring 14, the spring 26, the center tube 28, and the filter element 30 in the interior region 22. Further, the seal 48 engages an outlet post 50 of the base 18 to block fluid from flowing between the filter element 30 and the outlet post 50 into the filtered fluid region 46. The outlet post 50 defines a filtered fluid outlet passageway 52 for discharging filtered fluid from the filtered fluid region 46.

As the cover 20 is secured to the base 18, a quick-drain valve member 54 is advanced into engagement with a valve seat 56, as shown in FIG. 7, to block a flow of fluid from the interior region 22 through a quick-drain outlet 57. In particular, the seal 48 (or, in some cases, the end cap 42) engages the quick-drain valve member 54 to move the quick-drain valve member 54 against a biasing force provided by a spring 58 into engagement with the valve seat 56. The flange 31 of the center tube 28 may become spaced apart from the ring 14 as the connection between the cover 20 and the base 18 is tightened. However, the spring 26 continues to bias the center tube 28 and the filter element 30 downwardly so as to press the quick-drain valve member 54 against the valve seat 56. In this way, the spring 26 accommodates dimensional variations between components of the filter apparatus 10 due to, for example, manufacturing tolerances and thermal expansion.

Figure 8:
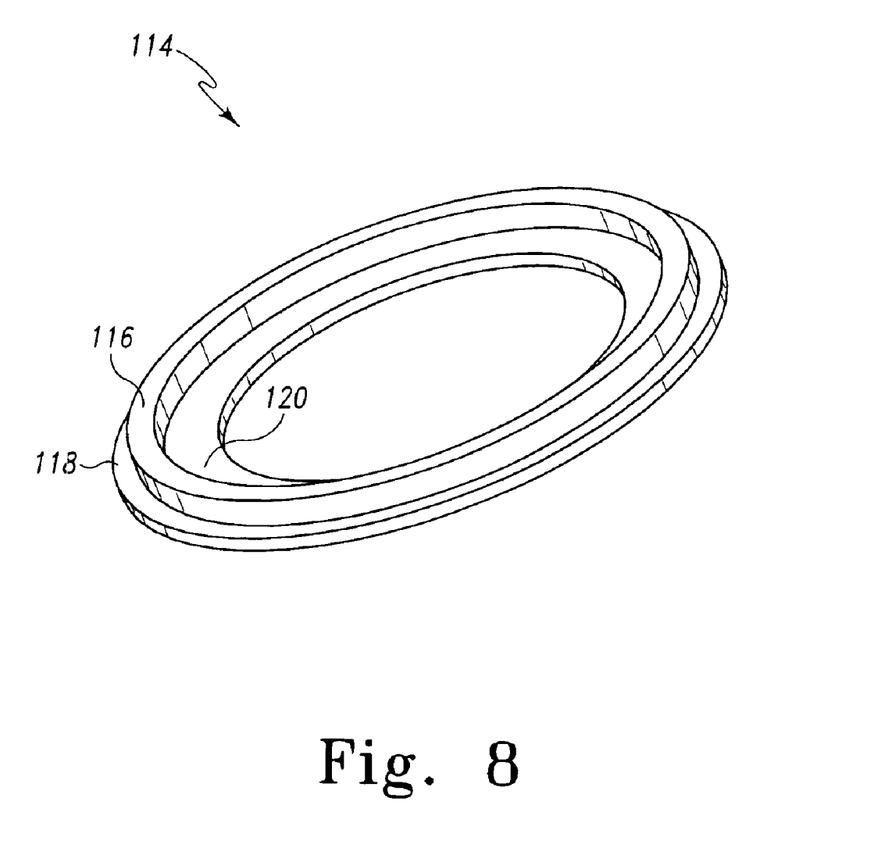
FIG. 8 is a perspective view of a generally T-shaped ring for use with the filter apparatus.
Figure 9:
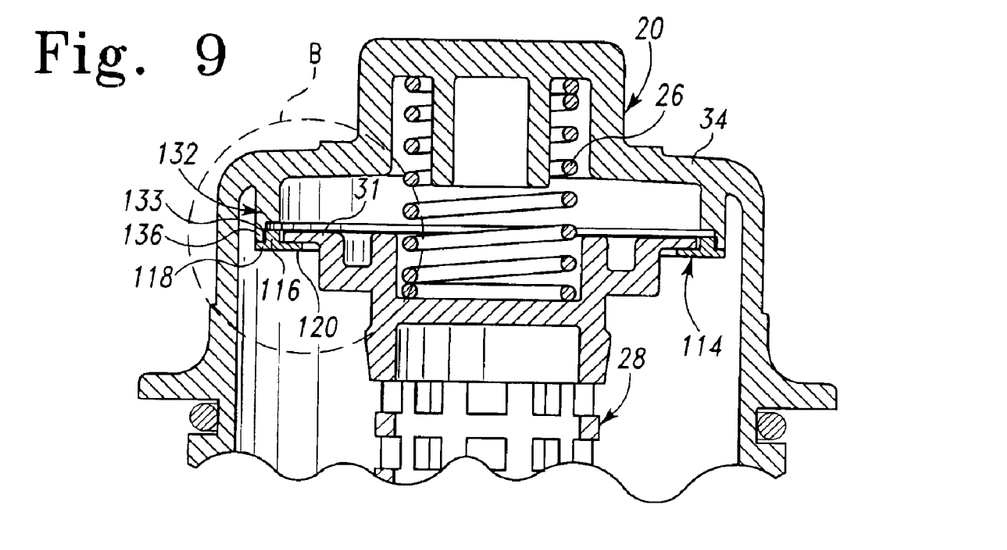
FIG. 9 is a sectional view showing the spring biasing the center tube against the generally T-shaped ring which is secured to the filter cover.
Figure 10:
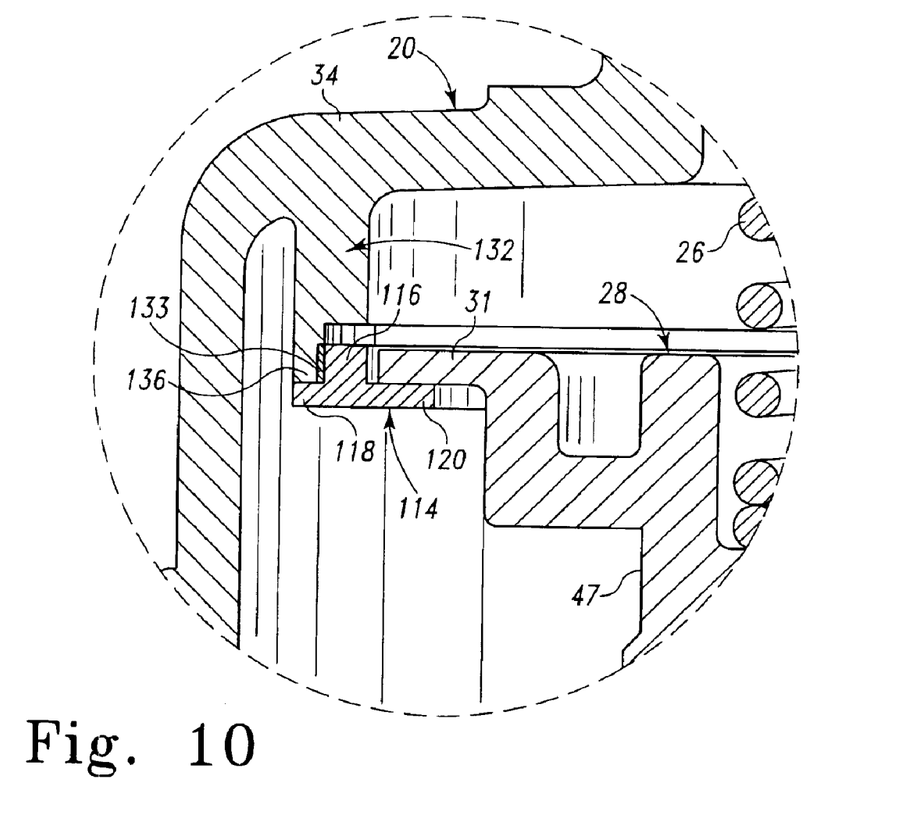
FIG. 10 is an enlarged sectional view of region B of FIG. 9 showing the generally T-shaped ring secured to the filter cover by a polymeric bond.

Another ring 114 for use with the filter apparatus 10 in a similar capacity as the ring 14 is shown in FIGS. 8–10. The ring 114 is secured to a standoff 132 of the filter cover 20 as discussed in more detail herein.

The ring 114 is generally T-shaped in cross-section. The ring 114 comprises an annular base 116, an annular flange 118 extending outwardly from the base 116, and an annular flange 120 extending inwardly from the base 116. The axial thicknesses of the flanges 118, 120 are, for example, about the same.

During assembly of the sub-assembly 24, the ring 114 is advanced against the standoff 132 and secured thereto by, for example, a polymeric bond 133. To facilitate such a polymeric bond 133, the ring 114 and the standoff 132 are made of, for example, a plastic material. The outwardly extending flange 118 is advanced against an outer surface of an ear 136 of the standoff 132 so as to position the base 116 next to an inner surface of the ear 136. The base 116 is then secured to the inner surface of the ear 136 by, for example, ultrasonically welding them together, spin welding them together, vibration welding them together, melting them together, or gluing them together. Accordingly, the ring 114 is non-unitary with the cover 20.

The inwardly extending flange 120 of the ring 114 engages the outwardly extending flange 31 of the center tube 28 to retain the spring 26, the center tube 28, and the filter element 30 secured to the center tube 28 within the cover 20 during advancement of the cover 20 into engagement with the base 18. The ring 114 has an inner diameter less than the outer diameter of the flange 31 for such engagement between the flanges 120, 31.

Figure 11:
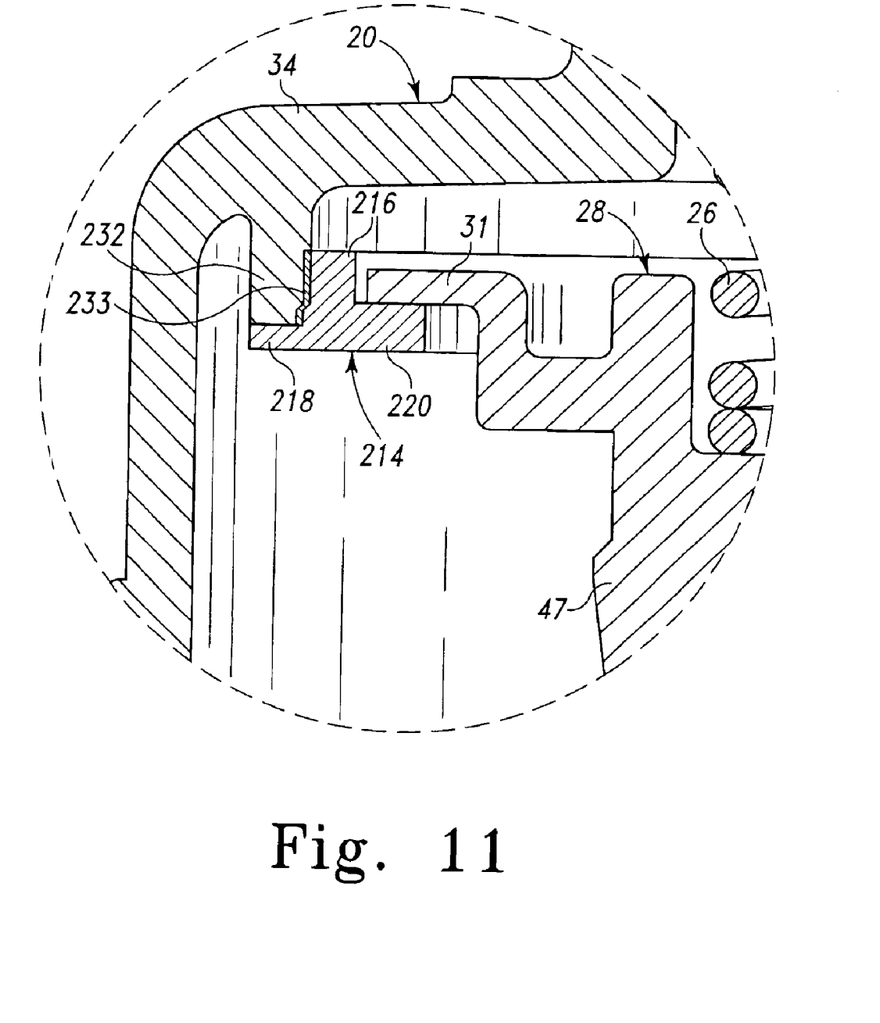
FIG. 11 is an enlarged sectional view similar to FIG. 10 showing another generally T-shaped ring for use with the filter apparatus.

Another ring 214 for use with the filter apparatus 10 in a similar capacity as the rings 14, 114 is shown in FIG. 11. The ring 214 is secured to a standoff 232 of the filter cover 20 as discussed in more detail herein.

The ring 214 is generally T-shaped in cross-section. The ring 214 comprises an annular base 216, an annular flange 218 extending outwardly from the base 216, and an annular flange 220 extending inwardly from the base 216. The axial thickness of the inwardly extending flange 220 is somewhat greater than the axial thickness of the outwardly extending flange 218.

During assembly of the sub-assembly 24, the ring 214 is advanced against the standoff 232 and secured thereto by, for example, a polymeric bond 233. To facilitate such a polymeric bond 233, the ring 214 and the standoff 232 are made of, for example, a plastic material. The outwardly extending flange 218 is advanced against an outer surface of the standoff 232 so as to position the base 216 next to an inner surface of the standoff 232. The base 216 is then secured to the inner surface of the standoff 232 by, for example, ultrasonically welding them together, spin welding them together, vibration welding them together, melting them together, or gluing them together. Accordingly, the ring 214 is non-unitary with the cover 20.

The inwardly extending flange 220 of the ring 214 engages the outwardly extending flange 31 of the center tube 28 to retain the spring 26, the center tube 28, and the filter element 30 secured to the center tube 28 within the cover 20 during advancement of the cover 20 into engagement with the base 18. The ring 214 has an inner diameter less than the outer diameter of the flange 31 for such engagement between the flanges 220, 31.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the apparatus and methods described herein. It will be noted that alternative embodiments of apparatus and methods of the present disclosure may not include all of the features described yet still benefit from at least some of the advantages of such features. Those of ordinary skill in the art may readily devise their own implementations of apparatus and methods that incorporate one or more of the features of the present disclosure and fall within the spirit and scope of the invention as defined by the appended claims.

What is claimed is:

1. A filter apparatus comprising:

a filter cover, a filter element configured to filter a flow of fluid advanced therethrough, a filter base, the filter cover being configured to be secured to the filter base to capture the filter element between the filter cover and the filter base, a center tube extending within the filter element, the filter element being secured to the center tube, and a ring secured to and non-unitary with the filter cover, the center tube being arranged for movement into engagement with a portion of the ring for retention of the center tube and the filter element in response to detachment of the filter cover from the filter base and arranged for movement out of engagement with the portion of the ring in response to securement of the filter cover to the filter base.

2. The filter apparatus of claim 1, wherein the filter cover comprises a standoff, and the ring is secured to the standoff.

3. The filter apparatus of claim 2, wherein the standoff comprises an ear bent over the ring to secure the ring to the standoff.

4. The filter apparatus of claim 2, wherein the ring is generally T-shaped in cross-section so as to comprise a base, a first flange extending outwardly from the base, and a second flange extending inwardly from the base, the base and the first flange engage the standoff, and the second flange extends between the center tube and the filter element to engage the center tube to retain the center tube and the filter element and disengage the center tube.

5. The filter apparatus of claim 2, wherein the ring comprises a surface which engages the standoff and provides the portion of the ring which is arranged to engage and disengage the center tube.

6. The filter apparatus of claim 1, wherein the filter cover comprises an ear bent over the ring to secure the ring to the filter cover.

7. The filter apparatus of claim 1, wherein the ring has a generally T-shaped cross-section.

8. The filter apparatus of claim 1, wherein the ring is secured to the filter cover by a polymeric bond.

9. The filter apparatus of claim 1, wherein the ring is welded or glued to the filter cover.

10. The filter apparatus of claim 1, further comprising a spring and a quick-drain valve, wherein the spring is captured between the filter cover and the center tube and applies a biasing force to bias the center tube toward engagement with the ring, the filter cover and the filter base cooperate to define an interior region containing the filter element when the filter cover is secured to the filter base, the filter base is formed to include an outlet, and the quick-drain valve is arranged for movement between a normally opened position opening the outlet to allow fluid to drain from the interior region through the outlet when the filter cover is detached from the filter base and a closed position closing the outlet to block drainage of fluid from the interior region through the outlet when the filter cover is secured to the filter base, and the center tube is arranged for movement against the biasing force of the spring and out of engagement with the portion of the ring in response to movement of the quick-drain valve from the opened position to the closed position and securement of the filter cover to the filter base.

11. The filter apparatus of claim 1, wherein the center tube comprises a tubular portion positioned within the filter element and a flange extending radially outwardly from the tubular portion for engagement and disengagement with the portion of the ring.

12. The filter apparatus of claim 11, wherein the flange comprises annular first, second, and third walls positioned in series in end-to-end relation, the first wall extends radially outwardly from the tubular portion and engages an axially facing surface of an end cap of the filter element, the second wall extends axially from the first wall and through an aperture defined by the ring, and the third wall extends radially outwardly from the second wall for engagement and disengagement with the portion of the ring.

13. The filter apparatus of claim 12, wherein the first and third walls are parallel to one another, and the second wall is perpendicular to the first and third walls.

14. The filter apparatus of claim 11, wherein the center tube is a one-piece structure such that the flange and the tubular portion are one piece with one another.

15. A filter apparatus comprising:

a housing comprising a base and a cover, the base and the cover defining an interior region when the cover is secured to the base, the cover comprising a standoff, a filter element configured to filter a flow of fluid through the interior region when the filter element is positioned in the interior region, a center tube to which the filter element is secured, the center tube comprising a tubular portion positioned within the filter element and a flange extending radially outwardly from the tubular portion and having an outer diameter, and a ring secured to the standoff and having an inner diameter less than the outer diameter of the flange for engagement between the ring and the flange to retain the center tube and the filter element, the center tube extending through an aperture defined by the ring.

16. The filter apparatus of claim 15, wherein the standoff comprises an ear bent over the ring to secure the ring to the standoff.

17. The filter apparatus of claim 15, wherein the ring is generally T-shaped and is secured to the standoff by a polymeric bond.

18. The filter apparatus of claim 15, wherein the standoff and the ring are non-unitary with one another.

19. The filter apparatus of claim 15, wherein the ring and the standoff are non-unitary with one another.

20. The filter apparatus of claim 15, further comprising a spring and a quick-drain valve, wherein the spring is captured between the cover and the center tube and applies a biasing force to bias the center tube toward engagement with the ring, the cover and the base cooperate to define an interior region containing the filter element when the cover is secured to the base, the base is fanned to include an outlet, and the quick-drain valve is arranged for movement between a normally opened position opening the outlet to allow fluid to drain from the interior region through the outlet when the cover is detached from the base and a closed position closing the outlet to block drainage of fluid from the interior region through the outlet when the cover is secured to the base, and the center tube is arranged for movement against the biasing force of the spring and out of engagement with the ring in response to movement of the quick-drain valve from the opened position to the closed position and securement of the cover to the base.

21. The filter apparatus of claim 15, wherein the flange comprises annular first, second, and third walls positioned in series in end-to-end relation, the first wall extends radially outwardly from the tubular portion and engages an axially facing surface of an end cap of the filter element, the second wall extends axially from the first wall and through an aperture defined by the ring, and the third wall extends radially outwardly from the second wall for engagement with the ring in response to detachment of the cover from the base and for disengagement from the ring in response to securement of the cover to the base.

22. The filter apparatus of claim 15, wherein the center tube is a one-piece structure such that the flange and the tubular portion are one piece with one another.

23. A method of assembling a filter apparatus, the method comprising the steps of:

securing to a filter cover a ring that is non-unitary with the filter cover so as to retain a center tube, securing a filter element to the center tube, and moving the center tube out of engagement with a portion of the ring in response to securement of the filter cover to a filter base.

24. The method of claim 23, wherein the step of securing the ring to the filter cover so as to retain the center tube comprises advancing the ring from a position spaced apart from the filter cover to a engaging the filter cover.

25. The method of claim 23, wherein the filter cover comprises a standoff, and the step of securing the ring to the filter cover so as to retain the center tube comprises (i) advancing the ring against the standoff and (ii) bending the standoff over the ring to secure the ring to the standoff.

26. The method of claim 23, wherein the filter cover comprises a standoff, and the step of securing the ring to the filter cover so as to retain the center tube comprises (i) advancing the ring against the standoff and (ii) securing the ring to the standoff by a polymeric bond.

27. The method of claim 23, wherein the step of securing the ring to the filter cover so as to retain the center tube comprises welding the ring to the filter cover.

28. The method of claim 23, wherein the step of securing the ring to the filter cover so as to retain the center tube comprises gluing the ring to the filter cover.

29. The method of claim 23, further comprising the steps of: (i) advancing the filter cover into contact with a filter base and (ii) securing the filter cover to the filter base, wherein both the advancing step and the step of securing the filter cover to the filter base are performed after the step of securing the ring to the filter cover and the step of securing the filter element to the center tube.

30. The method of claim 23, further comprising biasing the center tube into engagement with the portion of the ring by use of a spring positioned between the filter cover and the center tube, wherein the moving step comprises moving the center tube out of engagement with the portion of the ring in response to closure of an outlet formed in a filter base by a quick-drain valve and securement of the filter cover to the filter base.

31. The method of claim 30, wherein the center tube comprises a tubular portion positioned within the filter element and a flange comprising annular first, second, and third walls positioned in series in end-to-end relation, the first wall extends radially outwardly from the tubular portion and engages an axially facing surface of an end cap of the filter element, the second wall extends axially from the first wall and through an aperture defined by the ring, and the third wall extends radially outwardly from the second wall, the biasing step comprises biasing the third wall into engagement with the portion of the ring by use of the spring; and the moving step comprises moving the third wall out of engagement with the portion of the ring.

* * * * *